United States Patent
Conrad et al.

(10) Patent No.: US 8,302,191 B1
(45) Date of Patent: Oct. 30, 2012

(54) FILTERING MALWARE RELATED CONTENT

(75) Inventors: Robert Conrad, Culver City, CA (US);
Christopher Peterson, Culver City, CA (US); Joseph H. Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 614 days.

(21) Appl. No.: 12/404,249

(22) Filed: Mar. 13, 2009

(51) Int. Cl.
*G06F 21/00* (2006.01)

(52) U.S. Cl. ............................................. 726/23; 726/22

(58) Field of Classification Search ...................... 726/23
See application file for complete search history.

(56) References Cited

U.S. PATENT DOCUMENTS

| | | | |
|---|---|---|---|
| 7,237,008 B1 * | 6/2007 | Tarbotton et al. | 709/206 |
| 2007/0101430 A1 * | 5/2007 | Raikar | 726/24 |
| 2008/0133540 A1 * | 6/2008 | Hubbard et al. | 707/10 |

OTHER PUBLICATIONS

"TrustedSource(TM): the next generation reputation system" White Paper, Secure Computing Corporation, Oct. 2006, 6 pages.*

* cited by examiner

*Primary Examiner* — Jeffrey Pwu
*Assistant Examiner* — William J. Goodchild
(74) *Attorney, Agent, or Firm* — Brill Law Office; Jeffrey Brill

(57) ABSTRACT

A submission filtering component filters malware related content received for analysis. The submission filtering component determines an analysis priority rating for each source from which malware related content is received. An analysis priority ratings is based on various factors indicative of how likely the source is to transmit malware related content that is important to analyze. The malware filtering component transforms the received stream of malware related content into a subset to be analyzed, based on the analysis priority ratings associated with sources from which malware related content is received. A malware analysis component analyzes the subset of malware related content.

10 Claims, 3 Drawing Sheets

FILTERING MALWARE RELATED CONTENT

RELATED APPLICATION

This application is related to co-pending patent application Ser. No. 12/393,957, titled "Identifying Originators of Malware," filed on Feb. 26, 2009, and having the same assignee ("The Identifying Originators of Malware Application.").

TECHNICAL FIELD

This invention pertains generally to computer security, and more specifically to filtering malware related content.

BACKGROUND

Malware, such as computer viruses, worms and Trojan horses, is a serious threat to both business and personal computing. Various software vendors provide anti-malware products, which can detect, block and/or remove malware on a user's computer. Anti-malware products use various techniques to protect users from malware, such as, but not limited to, intrusion prevention, web browser defense, signature based detection, heuristic based detection and behavior based detection. When an anti-malware product detects malware, the anti-malware product can make a copy of the malware to analyze it, to learn more about both how it works and how to identify and disarm similar threats in the future. Additionally, users sometimes proactively submit suspect files to anti-malware vendors (e.g., over the Internet) to have them checked for malware. Such directly submitted files can also be analyzed by the anti-malware product.

Some commercial anti-malware products have very large foot prints in the security market. These products can receive so much detected malware and directly submitted suspected malware that limited hardware resources prevent the analysis of all of it. Therefore, such products only analyze a subset of the received malware (both detected and suspected). By not analyzing all of the received malware, important new malware could be overlooked, in favor of malware which is already well known. It would be desirable to address these issues.

SUMMARY

A submission filtering component filters malware related content received for analysis. The submission filtering component determines an analysis priority rating for each source from which malware related content is received. An analysis priority ratings is based on various factors indicative of how likely the source is to transmit malware related content that is important to analyze. The malware filtering component transforms the received stream of malware related content into a subset to be analyzed, based on the analysis priority ratings associated with sources from which malware related content is received. A malware analysis component analyzes the subset of malware related content.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
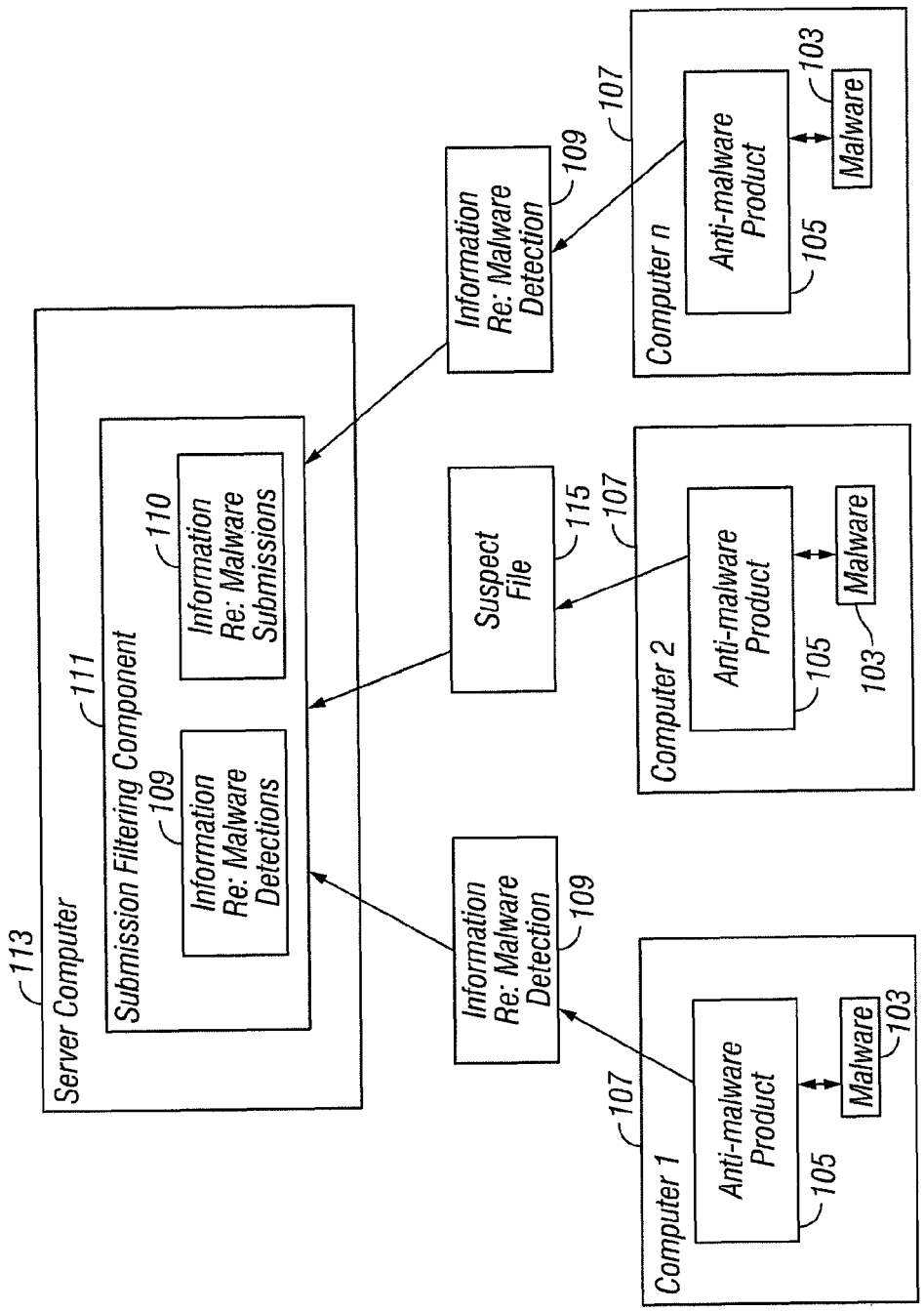
FIG. 1 is a block diagram illustrating a submission filtering component receiving information concerning detected malware from a plurality of user computers, according to some embodiments of the present invention.

FIG. 1 illustrates a submission filtering component 111 receiving information 109 concerning detected malware 103 from a plurality of user computers 107, according to some embodiments of the present invention. It is to be understood that although the submission filtering component 111 is illustrated in FIG. 1 as a separate entity, the submission filtering component 111 represents a collection of functionalities which can be implemented as software, hardware, firmware or any combination of these. Where the submission filtering component 111 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, an anti-malware product 105 is installed on the computers 107 of multiple users, and checks for and detects malware 103 thereon. The anti-malware product 105 can be instantiated in any known form or combinations of forms, such as, but not limited to an intrusion prevention system, a web browser defense system and/or a signature, heuristic and/or behavior based detection system. A user computer 107 can comprise any computing device operated by a user in a business or personal context. In FIG. 1, the anti-malware product 105 is illustrated as being installed on the user computers 107 themselves, but it is to be understood that an anti-malware product 105 and/or components thereof can also be installed on a server, a proxy or other computing devices depending upon the specific installation scenario. Also, only three user computers 107 running the anti-malware product 105 are shown for the sake of illustration, but in practice typically many orders of magnitude more would be deployed.

When the anti-malware product 105 detects malware 103 installed on a user's computer 107, the anti-malware product 105 sends information 109 concerning the detection of the malware 103 to a submission filtering component 111 for subsequent analysis. The submission filtering component 111 is located at a central location, for example a server computer 113 as illustrated. The information 109 that is sent to the submission filtering component 111 concerning the malware 103 detection can, but need not, include an actual copy of the malware 103 itself. An identification of the infected computer 107 is typically included in the information 109 (or determined by the submission filtering component 111). Additionally, users that suspect a given file 115 is infected with or comprises malware 103 submit suspect files 115 to the submission filtering component 111 to be checked for malware 103. Upon receipt, the submission filtering component 111 can note information 110 concerning submitted files 115, such as the source and content.

Figure 2:
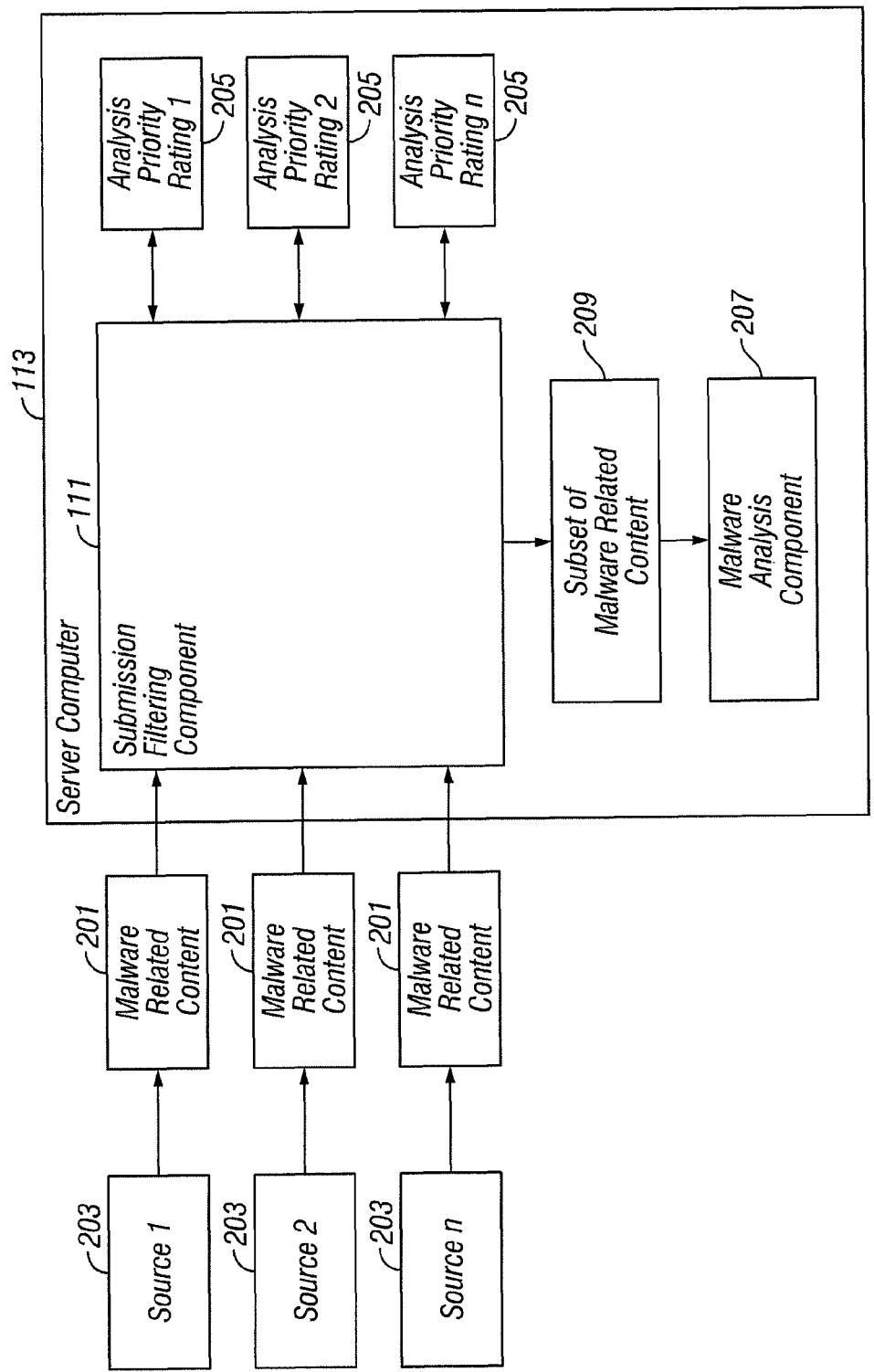
FIG. 2 is a block diagram illustrating a submission filtering component filtering received malware related content, according to some embodiments of the present invention.

Turning now to FIG. 2, the filtering operations of the submission filtering component 111 are explained. In conjunction with the discussion of FIG. 2, both information 109 concerning detected malware 103 and files 115 suspected to be infected with malware 103 that are received by the submission filtering component 111 are referred to as malware related content 201. As explained above, the volume of malware related content 201 received by the submission filtering component 111 can be so great that analyzing all of it is often not practicable. For this reason, the submission filtering component 111 determines which received malware related content 201 is to be analyzed, based on factors indicating the likelihood that received malware related content 201 originates from a source 203 (e.g., user computer 107, specific user of a given computer 107, a specific user of multiple computers 107, etc.) that is determined to merit closer attention (due to, e.g., location, previous rates of infection on source 203, rates of infection with new malware 103 on source 203, etc.). Additionally, as explained below in greater detail, in some embodiments the submission filtering component 111 proactively directs instances of the anti-malware product 105 running on various user computers 107 as to whether or not (and/or to what extent) to transmit malware related content 201 to the submission filtering component 111.

As illustrated in FIG. 2, the submission filtering component 111 determines an analysis priority rating 205 for each source 203 from which malware related content 201 is received. In some embodiments, the submission filtering component 111 determines analysis priority ratings 205 on a group basis (e.g., all user computers 107 and/or users at a given domain, enterprise, etc.) in addition to or instead of on an individual basis. By assigning analysis priority ratings 205 to different sources 203, the submission filtering component 111 can control which malware related content 201 is analyzed, such that priority is given to malware related content 201 received from sources 203 that are determined to be more likely to generate submissions of malware 103 of interest.

New malware 103 is less likely to have been previously analyzed than malware 103 that has already been in circulation, and is thus of greater interest.

Therefore, in some embodiments, responsive to determining that a source 203 is more likely to originate new malware 103, the submission filtering component 111 increases the analysis priority rating 205 of that computer accordingly. In different embodiments, different factors are used to determine how likely it is that a given source 203 is an originator of malware 103. For example, it is known that a disproportionate amount of malware 103 originates from certain countries (e.g., China, Lithuania, etc.). Therefore, in some embodiments, the submission filtering component 111 increases the analysis priority ratings 205 by a given amount for sources located in a suspect country. Analysis priority ratings 205 can also be lowered based on a source 203 being located in a more trusted country. The specific amount to adjust analysis priority ratings 205 based on sources 203 being located in specific countries is a variable design parameter. The submission filtering component 111 can determine in which country a source 203 is located, for example, from the country code in the uniform resource locator (URL), which can be included in the received content 201 or determined by the submission filtering component 111 from the transmission thereof.

The related co-pending Identifying Originators of Malware Application discloses technology for identifying sources 203 that are suspected of being associated with malware 103 origination. As disclosed in the Identifying Originators of Malware Application, that technology can be used to assign suspiciousness levels to sources 203, based on a variety of factors indicative of malware 103 origination, such as the history, content and context of submissions from given sources 203. In some embodiments of the present invention, the submission filtering component 111 uses the technology disclosed in the Identifying Originators of Malware Application to determine a likelihood that a given source 203 is an originator of malware 103, and adjusts the associated analysis priority rating 205 accordingly.

Other factors can also be used to adjust the analysis priority ratings 205. In one embodiment, instances of the anti-malware product 105 running on user computers 107 can monitor the behavior of the associated users, and rate how safe their network based activity is over time. For example, if a user always runs from behind a reputable firewall, scans his computer 107 for malware on a regular basis and never downloads files from unknown websites, the anti-malware product 105 could rate that user as being generally secure. On the other hand, a user that does not take such precautions would receive a lower security rating. The anti-malware product 105 could transmit the security rating for a given user as part of the malware related content 201, and the security rating could then be taken into account by the submission filtering component 111 in determining the associated analysis priority rating 205.

It is to be understood that analysis priority ratings 205 can be dynamic. In other words, the submission filtering component 111 can the adjust analysis priority rating 205 associated with a given source up or down responsive to detected and/or determined factors in real time. How suspicious specific characteristics and actions are considered to be is a variable design parameter. Additionally, what analysis priority rating 205 to assign based on various detected and/or determined factors is a variable design parameter, as is ongoing analysis priority rating 205 calculation and adjustment.

The submission filtering component 111 uses the analysis priority ratings 205 associated with the various sources 203 submitting malware related content 201 to determine which received malware related content 201 is to be analyzed. In general, a malware analysis component 207 can analyze a specific quantity of malware related content 201, based on available resources. This quantity can be defined in various ways in different embodiments of the present invention (e.g., units of storage size per period of time, percentage of amount received, specific units of storage size as corresponding resources become available, etc.) The submission filtering component 111 submits a subset 209 of the received malware related content 201 equal to the quantity to analyze to the malware analysis component 207, based on analysis priority ratings 205. In other words, if the quantity to be analyzed is, for example, 100 gigabytes per hour, the submission filtering component 111 submits, to the malware analysis component 207, per hour, the 100 gigabytes of malware related content 201 received from sources 203 with the highest analysis priority ratings 205. Whatever the quantity to be analyzed, the submission filtering component 111 submits the correspondingly sized subset 209 of the received malware content 201 with the highest analysis priority ratings 205 to the malware analysis component 207. That is to say, the submission filtering component 111 transforms the totality of the received malware related content 201 into a subset 209 for analysis, based on the associated analysis priority ratings 205. The malware analysis component 207 analyzes the subset 209 of malware related content 201.

It is to be understood that the quantity of malware related content 201 to analyze can be dynamic. In other words, the malware analysis component 207 can adjust this value up or down responsive to resource availability in real time. It is to be further understood that the malware analysis component 207 is located at a central location, for example a server computer 113 as illustrated. Note that although the malware analysis component 207 is illustrated as residing on the same server computer 113 as the submission filtering component 111, this need not be the case. Like the submission filtering component 111, the malware analysis component 207 represents a collection of functionalities which can be implemented as software, hardware, firmware or any combination of these.

Figure 3:
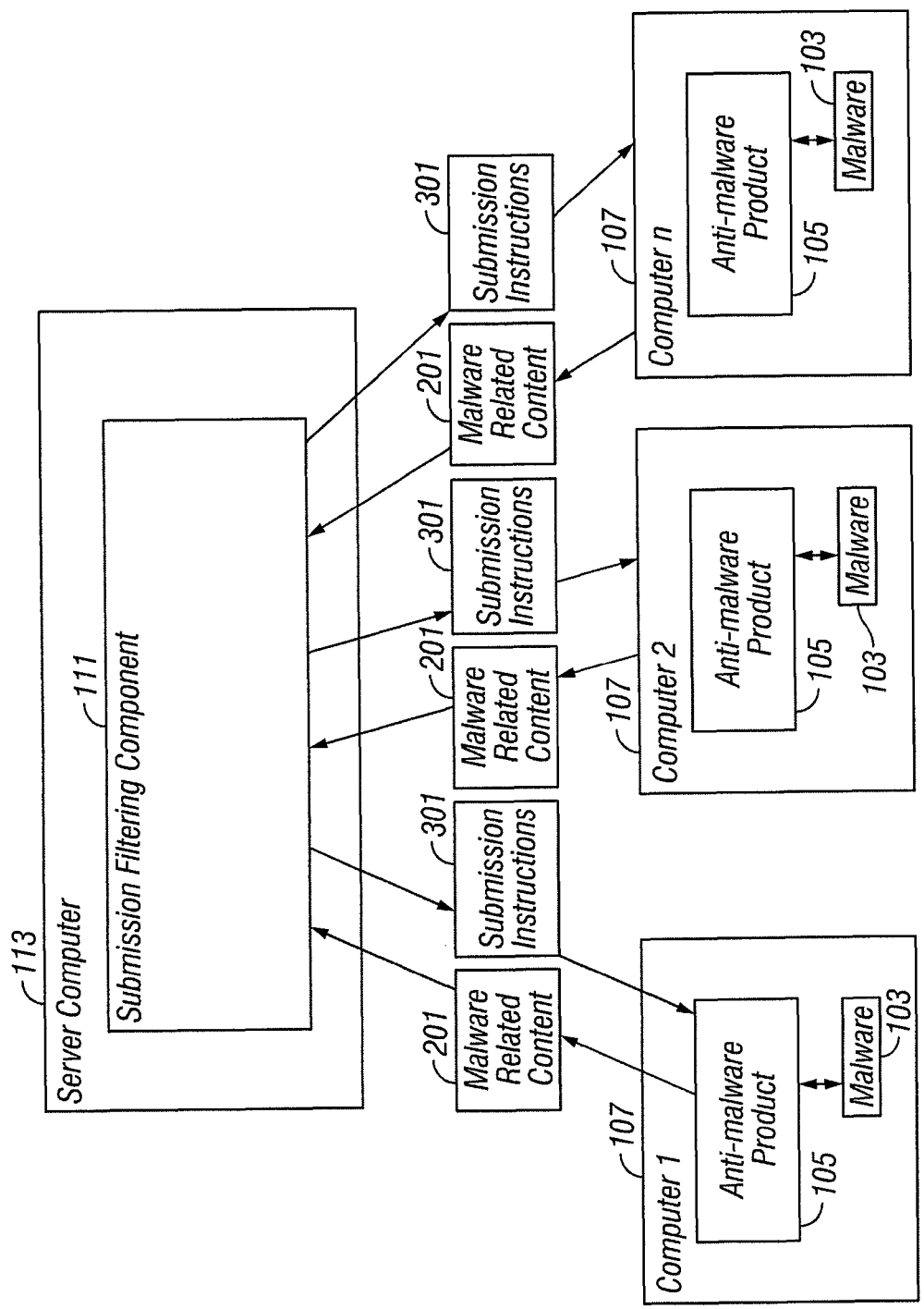
FIG. 3 is a block diagram illustrating a submission filtering component transmitting submission instructions to instances of an anti-malware product running on individual user computers, according to some embodiments of the present invention.

FIG. 3 illustrates an embodiment of the present invention in which the submission filtering component 111 proactively transmits submission instructions 301 specifying a requested amount of malware related content 201 to instances of the anti-malware product 105 running on individual user computers 107. In this embodiment, the submission filtering component 111 determines an amount of the malware related content to receive from each source 203 (or at least from some sources 203), based on the quantity to be analyzed and the analysis priority ratings 205 of the various sources 203. The submission filtering component 111 transmits corresponding submission instructions 301 to instances of the anti-malware product 105 running on individual user computers 107. The submission instructions 301 specify how much malware related content to submit (e.g., none, up to a specific number of storage units per period of time, all available, etc.), depending upon the corresponding analysis priority rating(s) 205. The instances of the anti-malware product 105 that receive submission instructions 301 submit malware related content 201 to the submission filtering component 111 according to the submission instructions 301. This prevents a certain amount of unnecessary transmission and processing of malware related content 201 that would not be analyzed even if it were transmitted to the submission filtering component 111.

In some embodiments, the submission filtering component 111 passes all malware related content 201 received from instances of the anti-malware product 105 according to submission instructions 301 to the malware analysis component 207. In other embodiments, the submission filtering component 111 still determines a subset 209 thereof to submit for analysis, for example where the amount received still exceeds the quantity to analyze. Note that in some embodiments the submission filtering component 111 transmits submission instructions 301 to all deployed instances of the anti-malware product 105, whereas in other embodiments only a subset thereof receive such submission instructions 301.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. Additionally, software components of the present invention are in no way limited to implementation in any specific programming language, or for any specific operating system or environment. Furthermore, it will be readily apparent to those of ordinary skill in the relevant art that where components of the present invention are implemented in whole or in part in software, the software components thereof can be stored as program code on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software components of the present invention can be instantiated (for example as object code or executable images) within the memory of any computing device, such that the software component(s) cause(s) the computing device to perform corresponding functionality. As used herein, the terms "computer," "server" and "computing device" mean one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for filtering malware related content for analysis, the method comprising the steps of:
  receiving malware related content forwarded from a plurality of sources that have received malware related content, by a computer;
  determining analysis priority ratings associated with specific ones of the plurality of sources, by a computer, each determined analysis priority rating indicating a priority for analyzing malware related content received from an associated source;
  creating a subset of received malware related content to be analyzed, based on at least available analysis resources and analysis priority ratings associated with sources from which malware related content is received, by a computer;
  responsive to a determined analysis priority rating associated with a source, transmitting submission instructions to that source, by a computer, the submission instructions directing that source as to how much malware related content to submit;
  receiving malware related content from that source according to the submission instructions, by a computer;
  adding all malware related content received from that source according to the submission instructions to the subset of malware related content to be analyzed, by a computer; and
  analyzing the subset of received malware related content, by a computer.

2. The method of claim 1 wherein receiving malware related content from a plurality of sources further comprises performing at least one step from a group of steps consisting of:
  receiving information concerning at least one detection of malware on at least one source, by a computer;
  receiving information concerning at least one detection of malware on at least one source, and determining additional information concerning the at least one detection from the receipt, by a computer;
  receiving at least one submission of suspected malware from at least one source, by a computer;

receiving at least one submission of suspected malware from at least one source, and determining additional information concerning the at least one submission from the receipt, by a computer;

receiving detected malware, by a computer; and receiving suspected malware, and determining the suspected malware comprises actual malware, by a computer.

3. The method of claim 1 wherein determining an analysis priority ratings associated with a specific one of the plurality of sources further comprises performing at least one step from a group of steps consisting of:

determining an analysis priority rating associated with a source responsive at least to identifying detection of new malware on the source, by a computer;

determining an analysis priority rating associated with a source responsive at least to identifying submission of new malware by the source, by a computer;

determining an analysis priority rating associated with a source responsive at least to identifying detection of malware early in its life cycle on the source, by a computer;

determining an analysis priority rating associated with a source responsive at least to identifying submission of malware early in its life cycle by the source, by a computer;

determining an analysis priority rating associated with a source responsive at least to identifying detection of suspicious malware on the source, by a computer;

determining an analysis priority rating associated with a source responsive at least to identifying submission of suspicious malware by the source, by a computer;

determining an analysis priority rating associated with a source responsive at least to identifying multiple detections of new malware on the source, by a computer;

determining an analysis priority rating associated with a source responsive at least to identifying multiple submissions of new malware by the source, by a computer;

determining an analysis priority rating associated with a source responsive at least to determining that the source comprises an originator of malware, by a computer;

determining an analysis priority rating associated with a source responsive at least to determining a security rating for the source, the security rating comprising an indication of how safe network related activity conducted at the source is over time, by a computer;

determining an analysis priority rating associated with a source responsive at least to identifying multiple detections, on the source, of malware early in its life cycle, by a computer;

determining an analysis priority rating associated with a source responsive at least to identifying multiple submissions, by the source, of malware early in its life cycle, by a computer;

determining an analysis priority rating associated with a source responsive at least to identifying multiple detections of suspicious malware on the single source, by a computer;

determining an analysis priority rating associated with a source responsive at least to identifying multiple submissions of suspicious malware by the source, by a computer;

determining an analysis priority rating associated with a source responsive at least to a country in which the source is located, by a computer;

determining an analysis priority rating associated with a source responsive at least to identifying detections of multiple instances of malware with different hash values but a single signature on the source, by a computer; and determining an analysis priority rating associated with a source responsive at least to identifying submissions of multiple instances of malware with different hash values but a single signature by the source, by a computer.

4. The method of claim 1 further comprising:

maintaining at least one dynamic analysis priority rating associated with at least one source of the plurality, by a computer; and modifying the at least one dynamic analysis priority rating in real time, by a computer.

5. The method of claim 1 wherein at least one source further comprises at least one from a group consisting of:

an individual computer;

a specific user of a specific computer;

a specific user of multiple computers;

a group of computers at a specific domain;

a group of users at a specific domain;

a group of computers at a specific enterprise; and a group of users at a specific enterprise.

6. At least one non-transitory computer readable storage medium containing a computer program product for filtering malware related content for analysis, the computer program product comprising:

program code for receiving malware related content forwarded from a plurality of sources that have received malware related content, by a computer;

program code for determining analysis priority ratings associated with specific ones of the plurality of sources, by a computer, each determined analysis priority rating indicating a priority for analyzing malware related content received from an associated source;

program code for creating a subset of received malware related content to be analyzed, based on at least available analysis resources and analysis priority ratings associated with sources from which malware related content is received, by a computer;

program code for, responsive to a determined analysis priority rating associated with a source, transmitting submission instructions to that source, the submission instructions directing that source as to how much malware related content to submit;

program code for receiving malware related content from that source according to the submission instructions;

program code for adding all malware related content received from that source according to the submission instructions to the subset of malware related content to be analyzed; and program code for analyzing the subset of received malware related content, by a computer.

7. The computer program product of claim 6 wherein the program code for receiving malware related content from a plurality of sources further comprises program code for performing at least one step from a group of steps consisting of:

receiving information concerning at least one detection of malware on at least one source;

receiving information concerning at least one detection of malware on at least one source, and determining additional information concerning the at least one detection from the receipt;

receiving at least one submission of suspected malware from at least one source;

receiving at least one submission of suspected malware from at least one source, and determining additional information concerning the at least one submission from the receipt;

receiving detected malware; and receiving suspected malware, and determining the suspected malware comprises actual malware.

8. The computer program product of claim 6 wherein the program code for determining an analysis priority ratings associated with a specific one of the plurality of sources further comprises program code for performing at least one step from a group of steps consisting of:

determining an analysis priority rating associated with a source responsive at least to identifying detection of new malware on the source;

determining an analysis priority rating associated with a source responsive at least to identifying submission of new malware by the source;

determining an analysis priority rating associated with a source responsive at least to identifying detection of malware early in its life cycle on the source;

determining an analysis priority rating associated with a source responsive at least to identifying submission of malware early in its life cycle by the source;

determining an analysis priority rating associated with a source responsive at least to identifying detection of suspicious malware on the source;

determining an analysis priority rating associated with a source responsive at least to identifying submission of suspicious malware by the source;

determining an analysis priority rating associated with a source responsive at least to identifying multiple detections of new malware on the source;

determining an analysis priority rating associated with a source responsive at least to identifying multiple submissions of new malware by the source;

determining an analysis priority rating associated with a source responsive at least to determining that the source comprises an originator of malware;

determining an analysis priority rating associated with a source responsive at least to determining a security rating for the source, the security rating comprising an indication of how safe network related activity conducted at the source is over time;

determining an analysis priority rating associated with a source responsive at least to identifying multiple detections, on the source, of malware early in its life cycle;

determining an analysis priority rating associated with a source responsive at least to identifying multiple submissions, by the source, of malware early in its life cycle;

determining an analysis priority rating associated with a source responsive at least to identifying multiple detections of suspicious malware on the single source;

determining an analysis priority rating associated with a source responsive at least to identifying multiple submissions of suspicious malware by the source;

determining an analysis priority rating associated with a source responsive at least to a country in which the source is located;

determining an analysis priority rating associated with a source responsive at least to identifying detections of multiple instances of malware with different hash values but a single signature on the source; and determining an analysis priority rating associated with a source responsive at least to identifying submissions of multiple instances of malware with different hash values but a single signature by the source.

9. The computer program product of claim 6 further comprising:

program code for maintaining at least one dynamic analysis priority rating associated with at least one source of the plurality; and program code for modifying the at least one dynamic analysis priority rating in real time.

10. The computer program product of claim 6 wherein at least one source further comprises at least one from a group consisting of:

an individual computer;

a specific user of a specific computer;

a specific user of multiple computers;

a group of computers at a specific domain;

a group of users at a specific domain;

a group of computers at a specific enterprise; and a group of users at a specific enterprise.

* * * * *